Aug. 25, 1925.

F. W. BERNAU 1,550,945

OPERATING CONTROL FOR CALCULATING MACHINES

Filed Nov. 10, 1921   2 Sheets-Sheet 1

Inventor;
Frederick W. Bernau
By [signature] Atty.

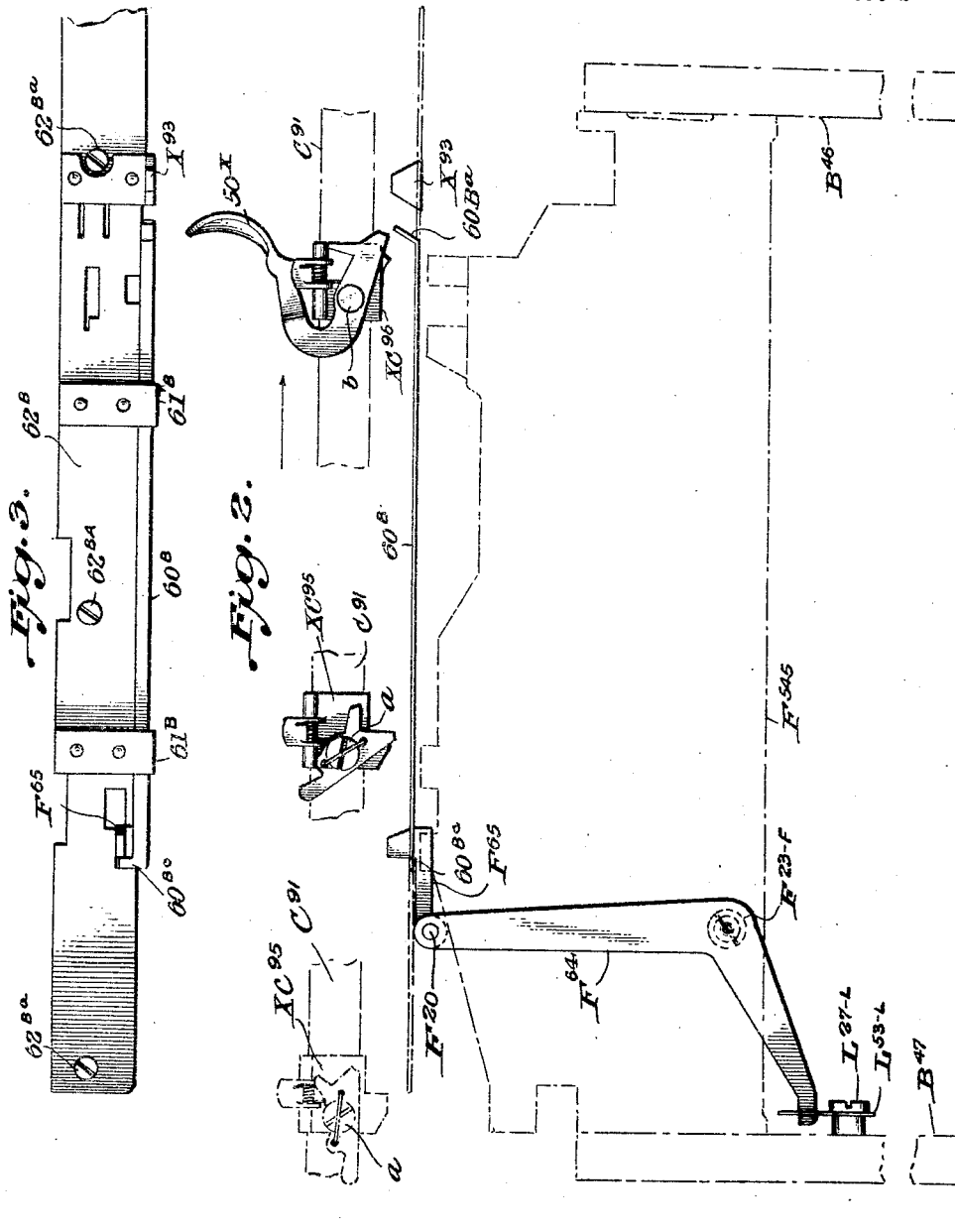

Patented Aug. 25, 1925.

1,550,945

UNITED STATES PATENT OFFICE.

FREDERICK W. BERNAU, OF NEWARK, NEW JERSEY, ASSIGNOR TO ELLIS ADDING-TYPEWRITER COMPANY, OF NEWARK, NEW JERSEY, A CORPORATION OF NEW JERSEY.

OPERATING CONTROL FOR CALCULATING MACHINES.

Application filed November 10, 1921. Serial No. 514,259.

*To all whom it may concern:*

Be it known that I, FREDERICK W. BERNAU, a citizen of the United States, residing at Newark, in the county of Essex and State of New Jersey, have invented certain new and useful Improvements in Operating Controls for Calculating Machines, of which the following is a specification.

In bank, and certain other loose-leaf ledger work there is a relatively large number of debits or withdrawals as compared to the credits or deposits. This necessitates a relatively large number of subtracting operations representing deductions as compared to adding operations in those adding and subtracting machines commonly called "bookkeeping" machines.

In department store and other charge account loose-leaf ledger work there are numerous debit or charge items as compared to the credits or payments made by the customer. This kind of account requires numerous adding operations as compared to subtracting operations.

My invention relates to the well known "Ellis" bookkeeping machine and has for its object the provision of means for automatically setting either the subtraction key or the adding key when the traveling carriage is in a predetermined position, or positions. When the ledger sheet is in position around the platen of the carriage, and the carriage is moved to a position where the printing group will make impressions in a column representing items to be deducted, or to be added, as may be predetermined, mechanism will be thereby automatically operated to depress the subtraction key, or the adding key, so that the machine will thereby be conditioned to repeatedly perform subtracting operations, or adding operations, without necessitating manual depression of the given key.

I accomplish the object of the invention by providing on the carriage one or more suitable, shiftable, or adjustable stops, and on the body of the machine provide mechanism adapted to be operated by said stop, or stops, which mechanism positively depresses the given key predetermined in the machine as, for instance, the subtraction key.

It is within the scope of my invention to provide latching means for the adding or subtraction key arranged to be released only when a total key, sub-total key, or the error key is depressed so that, once the adding or subtraction key is set, the machine will continue to carry on as many adding or subtracting operations as may be desired before a sub-total or total is taken, or, the adding or subtraction key may be arranged so that it will be automatically restored at the completion of each operation of the machine.

When that form of mechanism is used according to my invention whereby the adding or subtraction key remains down until released by the depression of either the error key, sub-total key, or the total key, the carriage may be spaced or moved to any other tabular position without disturbing the adding or subtracting condition in which the accumulator has been placed and, hence, repeated adding or subtracting operations may be carried on as long as desired regardless of the position of the carriage, once the carriage has depressed the subtraction key.

My invention is effective regardless of whether the machine is one which is provided with a carriage adapted for manual return, or one which has an automatic carriage return mechanism.

In carrying out my invention I may employ a stop on the carriage which, when set, will remain set for operating the mechanism which depresses the adding or subtraction key, or a stop which may be set by the pressure of the finger thereagainst and, when released, will return to inoperative position, so that said stop will only be effective for certain purposes, or, stops of both kinds may be used at the same time.

A manually held stop, such as I have referred to, has particular usefulness in connection with ledger work of department and other stores for insuring a subtracting operation on those relatively infrequent occasions (as compared with relatively frequent debit items) when a payment is made by the customer or credit is given to the customer for the return of an article, such items being printed in the credit column of the ledger sheet.

For the purpose of providing for repeated subtractions when the carriage is in a position where printing will be effected in a debit column and, in addition, making provision for printing credit items, the mechanism for setting the subtraction key is arranged so that both kinds of stops may co-operate with the said mechanism. Thus, there is provided in addition to the automatic control of the subtraction key by the carriage, an additional, permissive manual control of said subtraction key.

In bank ledger work and in certain other kinds of machine bookkeeping, the first step is to pick up the old balance and print it in the old balance or proof column which is frequently at the right hand side of the ledger sheet; the next step being to begin the printing of checks or debits in a charge or check or debit column which is frequently at the left hand margin of the sheet and to continue these subtracting operations until all items have been listed and subtracted and, thereupon, to print the new balance.

With my improvements, after the old balance has been picked up and printed, and the carriage has been shifted to that position where listing of checks or other debits on the ledger sheet will result on setting up the proper numbers and operating the machine, the placing of the carriage in that particular position will cause the settable stop thereon to operate the mechanism which sets the subtraction key. Consequently, the machine is immediately placed in the desired subtracting condition so that all items set up and printed when the carriage is in that position and which should appear in the proper column, will be subtracted.

My mechanism, as shown in the drawings and hereinafter described, is also adapted to remain in its subtracting condition until either the error key, sub-total key, or total key is depressed, even though the carriage be moved to another position.

The mechanism may, however, be so arranged that the subtraction key will be released on each operation of the machine. The manually settable stop may be depressed by the finger of the operator to set the subtracting key for printing in a credit column any item which represents a subtraction as, for instance, in department store work where a payment is made on account, or in full, or credit is given for the return of an article, these items representing deductions from the charges against the customer.

The mechanism entering into my invention is susceptible of modification without departing from the essential principles thereof and the disclosure, therefore, is to be considered as illustrative, instead of restrictive, of the scope of the invention.

In the accompanying drawings:

Fig. 2 is a front elevation of the mechanism; the keys, and their latches, being omitted, and the different stops shown;

Fig. 3 is a detail plan view of the top guide plate;

The mechanism entering into the present invention is shown in connection with only so much of an "Ellis" machine as will afford a clear understanding of its construction and operation. Reference may be had to certain of the patents of Halcolm Ellis as follows: Nos. 1,197,276 and 1,197,278, dated September 5, 1916, and 1,203,863, dated November 7, 1916, for a disclosure of other mechanisms of said machine. It is to be understood, however, that my invention is not limited to use in connection with the Ellis machine as it may be applied to other bookkeeping machines employing a traveling carriage and adding or subtraction keys.

The side frames of the machine appear at B46 and B47 and the top plate of the keyboard is shown at K50.

Figure 4:
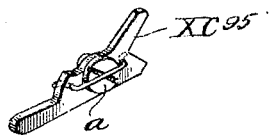
Fig. 4 is a detail view of the stop by which the subtraction key is automatically set.
Figure 5:
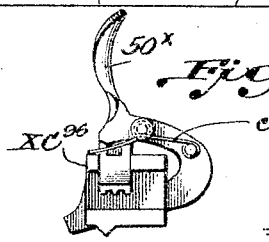
Fig. 5 is a similar view of the manually operated stop for setting the subtraction key.

The rack stop bar which is carried by the traveling carriage of the Ellis machine appears at C91. The purpose of this bar is to carry, in any position desired, the settable or adjustable stops by which the different mechanisms of the machine are controlled according to predetermined positions of the carriage. This bar is used for carrying the stops XC95 and XC96 (Figs. 2, 4 and 5) which set the subtraction key K67 when the carriage is in certain positions, provided these stops are set for operation.

The stop XC95 is pivoted to its carrier at $a$ and adapted to be turned up as shown at the left in dotted lines in Fig. 2 so that it is inoperative for the purpose of setting the subtraction key K67. This stop may be turned down or set as shown in full lines for the purpose of rendering it effective to engage the hook F65 and bring about the depression of the subtracting key K67 when the carriage is in such position that the stop will engage the hook F65.

The stop XC96 has a body adapted to engage the bar C91 and a lever 50X which is pivoted to the body at $b$ and is spring-retracted by a spring $c$. When the finger of the operator is pressed against the lever 50X, the toe or point of the stop is lowered so that it may engage the upturned end $60B^a$ of a pull strip 60B which is slidable in guides 61B and has an end $60B^c$ which is engaged with the hook F65.

The guides 61B are carried by a top guide plate 62B which is suitably fastened to the frame of the machine as, for instance, by screws 62B<sup>a</sup>. The hook X65 extends upwardly through the plate 62B in position to be engaged by the stop XC95.

The other points or devices used on the machine for controlling other functions thereof may project through the plate 62B so that they will be in position to be engaged by their controlling stops (not shown) on the stop rack bar C91.

The top guide plate 62B is provided with a fixed stop or abutment X93 against which the turned up end 60B<sup>a</sup> is pressed when the stop lever 50X is operated.

A bell crank lever F64 pivoted at F23F, carries the hook F65, said hook being pivoted thereto at F20.

The operative connection between the bell crank lever F64 and the subtraction key K67 is a lever L53L which is pivoted at L27L and has its rear end overlying the lateral arm of lever F64. The other arm of the lever L53L overlies a pin K67<sup>a</sup> on the stem of the subtraction key K67.

Consequently, when the hook F65 is pulled to the right, Fig. 2, or the slide strip 60B is pulled, the rear end of lever L53L is raised and its forward end depressed whereupon the subtraction key K67 is depressed.

The latch for the subtraction key is shown at L160, said latch being pivoted to the frame at L20. The upper end of the latch has a lug which is adapted to enter the notch $n$ in subtraction key K67 when the subtraction key is depressed. A spring 81L tends to draw the latch L160 into engagement with the notch $n$.

The latch L160 is provided with a pin L22L which cooperates with a pivoted piece L162 by which mechanism is operated whereby the accumulator is set for subtraction when the key K67 is depressed.

The key K67 remains in depressed position and the machine continues to carry on subtracting operations, until the latch L160 is released from the notch $n$.

I prefer to have the subtraction key K67 held down by the latch L160 until the error key K61, or, the total key K63, or, the sub-total key K64 is depressed, to thereby keep the machine in subtracting condition without further attention on the part of the operator, assuming he wishes to continue a series of subtracting operations. This condition will prevail regardless of whether the carriage remains in its original position where the stop XC95 has pulled the hook F65 to the right, or, the lever 50X has accomplished this function.

The latches for the key K63 and key K64 appear at L56 and 56L, said latches being pivoted at L19L. The latches are pulled in a manner to cause them to engage the notches in the key stems (when the keys are depressed) by springs 82L, 83L, respectively. Thus, when the keys K63, K64 are depressed, they are latched in the same manner as in the Ellis patents. The pins L14L and L21L at the lower ends of the latches 56L and L56 cooperate with other mechanism, for a disclosure of which reference is to be had to the Ellis patents. To cause the release of the subtraction key K67 when either of the keys K63, K64 are depressed, there is provided an unlatching member L70 which is pivoted at L71 to the latch L160. The unlatching member L70 has a bifurcated end which straddles a pin L12 on the latch L56 and it also has a cut out part which rests on a pin L21 projecting from the latch 56L.

Figure 1:
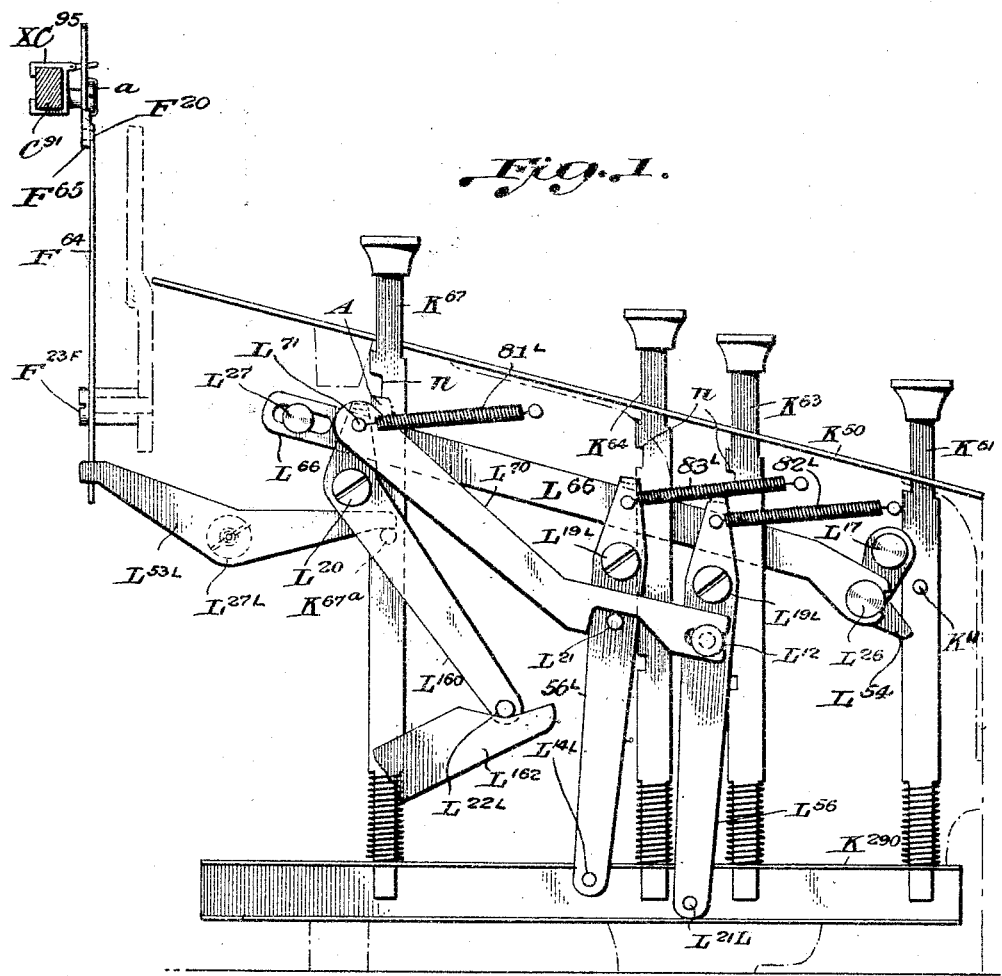
Figure 1 is a side elevation of the controlling keys and mechanism entering into the present invention, shown as they would appear in the "Ellis" bookkeeping machine.

Normally the unlatching member L70 is in the position shown in Fig. 1. If the subtraction key K67 has been depressed, either by hand or by the lever L53L, the movement of the upper end of the latch L160 to the right as its lug engages the notch $n$, results in shifting the unlatching member L70 to the right, thus bringing the shoulders at the ends of the bifurcated and cut out parts close to the pins L12 and L21.

If the sub-total key K64 is depressed, or the total key K63 is depressed, the corresponding latch 56L or L56 swings to latch its key and in doing this one or the other of the pins L12, L21, pushes the unlatching member L70 to the left, thereby unlatching the latch L160 from the notch $n$ of the subtraction key K67 whereupon said key will snap up and the function of subtraction will cease.

As in the Ellis patents, there is provided a rocker L54 pivoted at L17 and arranged to be engaged by a pin K11 on the error key K61 when said key is depressed. A releasing bar L66 is pivoted to the rocker L54 at L26 and has a pin and slot connection L27 and is also provided with a lug A which is arranged to engage the rocking end of the latch L160. Consequently, when the error key is depressed, the latch L160 will be released from the subtraction key K67, allowing the latter to snap up.

When the stop XC95 is turned down so as to be in the path of the hook F65 and the carriage of the machine is moved either manually or automatically to bring the stop XC95 into engagement with the hook F65, the subtraction key K67 is immediately set and the machine is set for carrying on repeated subtractions until any one of the keys K61, K63, K64 is depressed. Thus, a series of items may be printed and successively subtracted until, finally, when the sub-total or total is desired, it may be taken and printed. Once the subtraction key is set, it remains in its set position until released, regardless of whether the stop XC95 is engaged with hook F65, or, the carriage is in some other position.

In ledger work, for instance bank ledger operations, once the old balance has been picked up and printed, the carriage can be shifted to the position where checks are to be listed in the proper column on the ledger sheet and the stop XC95 having been set to engage the hook F65 when the carriage is in that position, the subtraction key K67 is immediately automatically depressed and the amounts of the successive checks go into the subtracting column. When the list has been completed, the carriage can be shifted to the position where the new balance is to be printed and then the total key K63 depressed to show the balance, or, the sub-total key K64 may be depressed if a sub-total only is desired.

It will be observed that normally the stop 50X is inoperative. In department store ledger work, where credit items such as partial or full payments or credit for the return of an article, are to be printed, these amounts should be deducted from the balance due from the customer to the store. To enter such an item, the operator presses against the lever 56X which brings its point in line with the upturned part 60B<sup>a</sup> and in the operation of moving the carriage to the right, the strip 60B is thereby shifted until stopped by striking the abutment X93. This operation depresses subtraction key K67 and the item or items are thus subtracted, the accumulator remaining in that condition until the subtraction key K67 is released.

The "Ellis" machine has several keys known as "operating" keys which, respectively, control some "operation" of the machine, such as addition, subtraction, and non-add, and while I have illustrated and described my invention in connection with but one of said keys, the subtraction key K67, I do not intend to limit the invention to use in connection with the particular key (K67) specified.

I claim:

1. In a calculating machine having a traveling carriage, the combination with means for controlling the performance of an operation by the machine, of mechanism controlled by the carriage when in a predetermined position adapted for operating said controlling means, and means for retaining said controlling means in its operated condition regardless of the position of the carriage so that the machine will remain in the condition in which it has thus been set until said controlling means is restored to normal position.

2. In a calculating machine having a traveling carriage, the combination with a manually settable operating key adapted, when set, to condition the mechanism of the machine to perform an operation, of mechanism controlled by the carriage adapted for automatically setting said key when the carriage is in a predetermined position.

3. In a calculating machine having a traveling carriage, the combination with a key for controlling an operation of the machine, of mechanism controlled by the carriage adapted for setting said key, means for retaining the said key in set condition so that repeated operations controlled thereby may be carried on regardless of the position of the carriage, an error key, and means for effecting restoration of the aforesaid key to normal position when said error key is operated.

4. In an adding and subtracting machine having a traveling carriage, the combination with a settable key adapted for controlling an operation of the machine, of mechanism adapted for setting said key, and one or more stops carried by the carriage and adapted to be arranged as desired thereon adapted to cooperate with said key-setting mechanism whereby, when the carriage is in one or more predetermined positions, the said mechanism will be operated to thereby set the machine to perform the predetermined operation, said key once having been set, remaining in set position regardless of the position of the carriage.

5. In a calculating machine, the combination with a traveling carriage, of a key for controlling an operation of the machine, mechanism actuated by the carriage adapted to operate said key when the carriage is in a predetermined position, and means for retaining said key in its operated position so that the machine will remain under the control of said key regardless of the position of the carriage until said retaining means is released.

6. In a calculating machine, the combination with a traveling carriage, of a key for controlling an operation of the machine, mechanism actuated by the carriage adapted to operate said key, means for retaining said key in its operated position so that the machine will remain under the control of said key until said retaining means is released, a total key, and means for effecting restoration of the controlling key aforesaid to normal position when said total key is operated.

7. In a calculating machine, the combination with a traveling carriage, of a key for controlling an operation of the machine, mechanism actuated by the carriage adapted to operate said key, means for retaining said key in its operated position so that the machine will remain under the control of said key until said retaining means is released, a sub-total key, and means for effecting restoration of the controlling key aforesaid to normal position when said sub-total key is operated.

8. In a calculating machine, the combination with a traveling carriage, of a key for controlling an operation of the machine, mechanism actuated by the carriage adapted to operate said key, means for retaining said key in its operated position so that the machine will remain under the control of said key until said retaining means is released, an error key, a total key, a sub-total key, and means for effecting restoration of the controlling key aforesaid to normal position when either the error key, total key, or sub-total key is operated.

9. In a calculating machine, the combination with a traveling carriage, of means for controlling a calculating operation of the machine, and a stop on the carriage arranged to be manually held in operative position, when desired, for operating the aforesaid means.

10. In a calculating machine, the combination with a traveling carriage, of settable means for effecting and maintaining a calculating operation of the machine, and a stop on the carriage arranged to be manually held in operative position, when desired, for operating the aforesaid means.

11. In a calculating machine, the combination with a traveling carriage, of settable means for effecting and maintaining an operation of the machine, and a stop on the carriage arranged for operating the aforesaid means, said settable means, once having been set by said stop, being adapted thereafter to remain set regardless of subsequent movement of the carriage, and means for releasing said settable means.

In testimony whereof I affix my signature.

FREDERICK W. BERNAU.